(12) United States Patent
Hara

(10) Patent No.: US 11,067,762 B2
(45) Date of Patent: Jul. 20, 2021

(54) OPTICAL MODULE INCLUDING PHOTO DETECTOR WITH LENS

(71) Applicant: Sumitomo Electric Industries, Ltd., Osaka (JP)

(72) Inventor: Hiroshi Hara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/775,322

(22) Filed: Jan. 29, 2020

(65) Prior Publication Data

US 2020/0241224 A1 Jul. 30, 2020

(30) Foreign Application Priority Data

Jan. 30, 2019 (JP) .............................. JP2019-014374

(51) Int. Cl.
*G02B 6/42* (2006.01)
*H04J 14/02* (2006.01)

(52) U.S. Cl.
CPC ............. *G02B 6/4214* (2013.01); *G02B 6/42* (2013.01); *G02B 6/4215* (2013.01); *H04J 14/02* (2013.01)

(58) Field of Classification Search
CPC .................................................. G02B 6/4215
See application file for complete search history.

(56) References Cited

U.S. PATENT DOCUMENTS

2014/0346323 A1* 11/2014 Fujimura ............. G02B 6/4215
250/208.2
2017/0134099 A1* 5/2017 Hara ................... G02B 6/29367

FOREIGN PATENT DOCUMENTS

JP 2017-032731 A 2/2017

* cited by examiner

*Primary Examiner* — Sung H Pak
(74) *Attorney, Agent, or Firm* — Baker Botts L.L.P.; Michael A. Sartori

(57) ABSTRACT

An optical module according to an aspect of the present disclosure includes a substrate having a base plane, an optical circuit element having an optical waveguide and a reflector, a support member, a photo detector mounted on the base plane, the photo detector including a condenser lens and a light-receiving layer. The light beam travels along an optical path from the reflector to the tangent plane, the optical path having a shortest distance set to be smaller than a preset value, and as viewed from a direction perpendicular to the base plane, the light beam has an optical axis set apart from the top of the condenser lens by an offset distance.

7 Claims, 9 Drawing Sheets

OPTICAL MODULE INCLUDING PHOTO DETECTOR WITH LENS

TECHNICAL FIELD

An aspect of the present disclosure relates to an optical module.

BACKGROUND

Japanese Unexamined Patent Publication No. 2017-32731 describes a wavelength multiplexing optical receiver module. The wavelength multiplexing optical receiver module splits a wavelength multiplexed light beam including a plurality of signal light beams having wavelengths different from each other into single signal light beams, and reproduces signals included in the signal light beams. The wavelength multiplexing optical receiver module includes an optical receptacle to which an external fiber is connected and a package in which a light receiving element is housed. In the inside of the package, an optical demultiplexer and a mirror are housed. The optical demultiplexer demultiplexes a wavelength multiplexed light beam emitted from a collimating lens disposed in the inside of the optical receptacle into a plurality of signal light beams having wavelengths different from each other. The mirror reflects the demultiplexed signal light beams. In the inside of the package, a lens array that condenses the light beam reflected off the mirror and a PD (Photo Diode) that receives the light beam condensed at the lens array are disposed. The PD has a monolithic lens that receives the light beam from the lens array, a receiving layer that receives the light beam transmitted through the monolithic lens, and a reflecting layer located below the receiving layer.

SUMMARY

An optical module according to an aspect of the present disclosure includes a substrate having a base plane, an optical circuit element having an optical waveguide and a reflector, the optical waveguide being configured to propagate an optical signal in a propagation direction parallel to the base plane, the reflector being configured to reflect an optical signal propagated through the optical waveguide and to output a reflected optical signal toward the substrate as a light beam, a support member supporting the optical circuit element above the base plane, a photo detector mounted on the base plane, the photo detector including a condenser lens and a light-receiving layer, the condenser lens being configured to converge the light beam onto the light-receiving layer, the light-receiving layer being parallel with the base plane. The light beam output from the reflector goes toward the condenser lens in a direction perpendicular to a tangent plane at a top of the condenser lens. The light beam travels along an optical path from the reflector to the tangent plane, the optical path having a shortest distance set to be smaller than a preset value, and as viewed from a direction perpendicular to the base plane, the light beam has an optical axis set apart from the top of the condenser lens by an offset distance.

DETAILED DESCRIPTION

Detail of Embodiment

Figure 1:
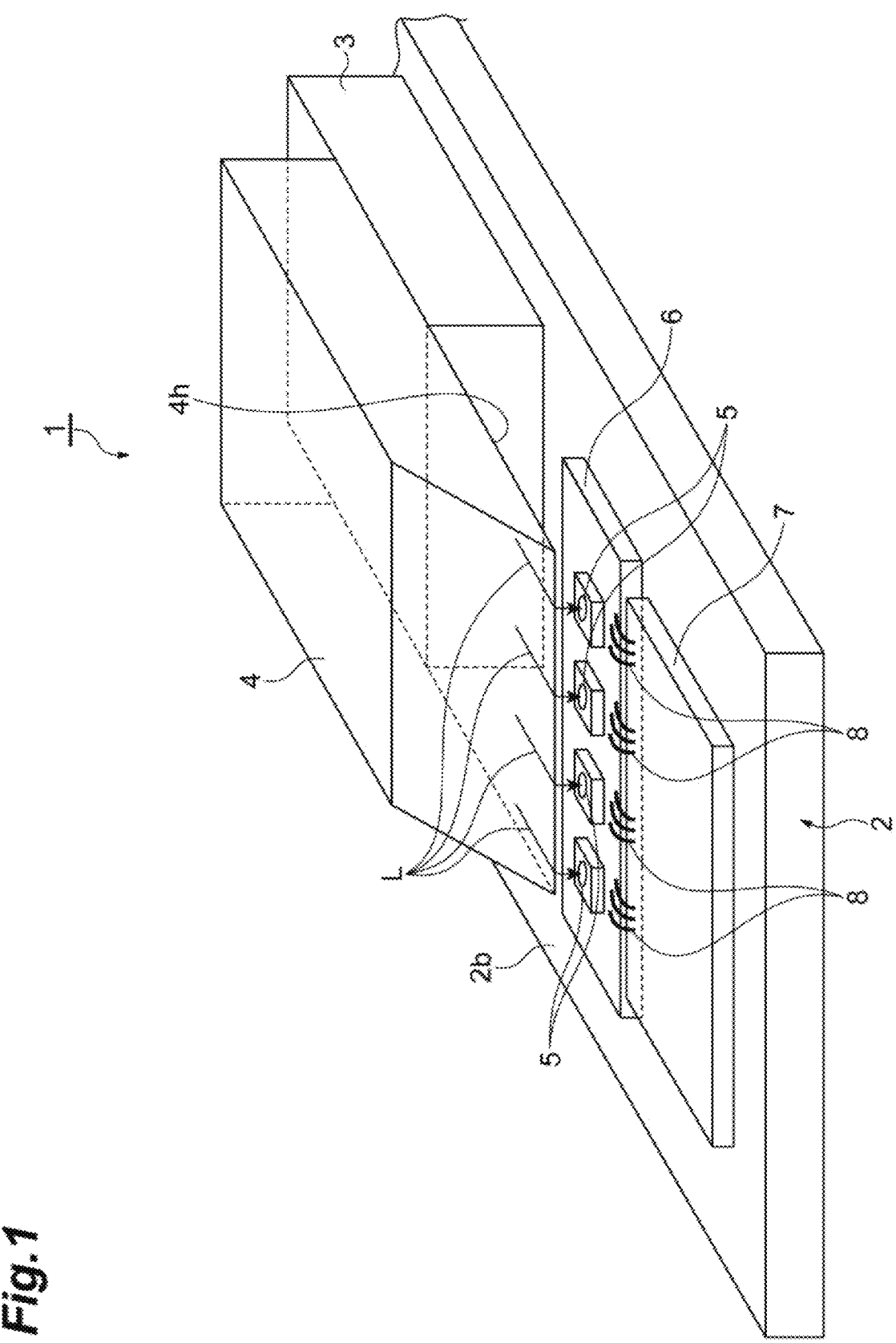
FIG. 1 is a perspective view showing an optical module according to an embodiment of the present disclosure.

In the following, a specific example of an optical module according to an embodiment will be described with reference to the drawings. The present invention is not limited to the following exemplification, and is intended to include all modifications described in claims and within the scope equivalent to the scope of claims. In the description of the drawings, the same or corresponding elements are designated with the same reference signs, and the duplicate description is appropriately omitted. For easy understanding, a part of the drawings is sometimes simplified or exaggerated, and dimensions, ratios and angles are not limited to ones described in the drawings.

Figure 2:
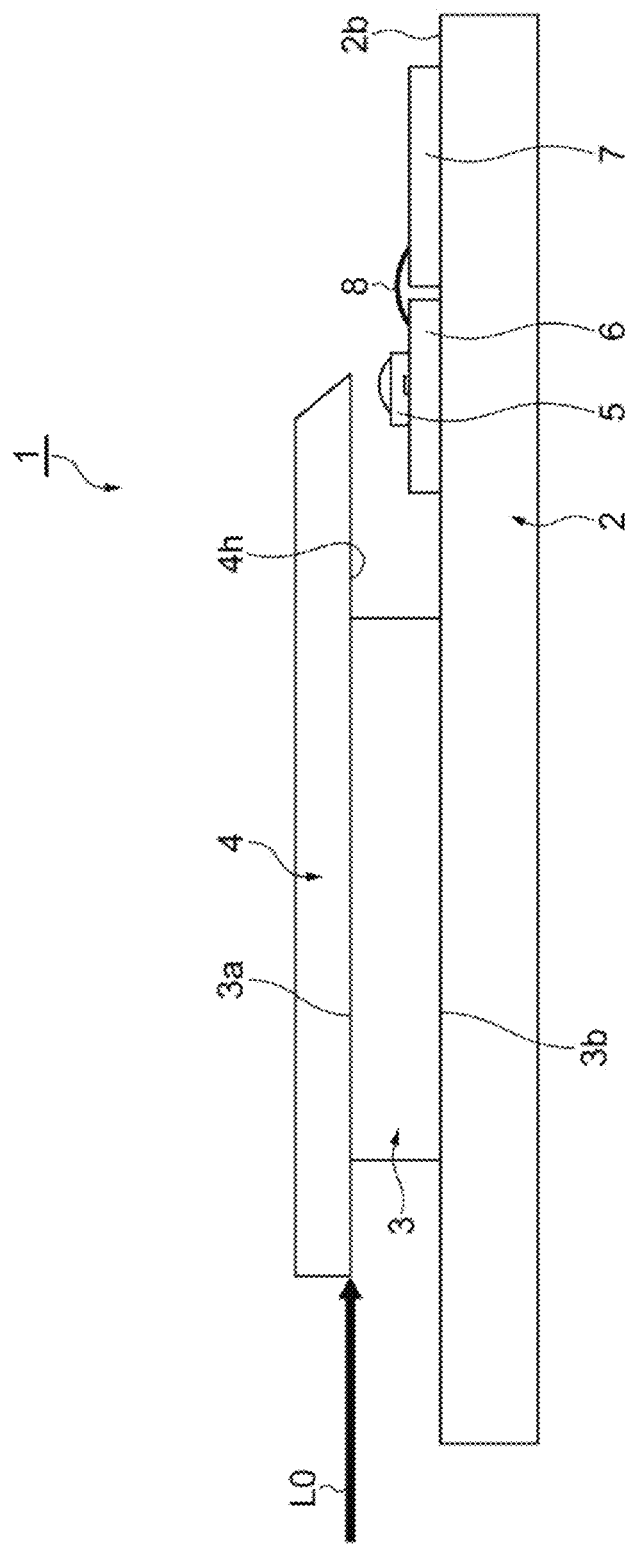
FIG. 2 is a side view showing the optical module in FIG. 1.

FIG. 1 is a perspective view showing an optical module 1 according to the embodiment. FIG. 2 is a side view showing the optical module 1. As shown in FIGS. 1 and 2, the optical module 1 includes a substrate 2 installed with a circuit that processes electrical signals and having a base plane 2b, a support member 3 installed on the mounting surface 2b, an optical circuit element 4 that demultiplexes multiplexed optical signals, and a plurality of light receiving elements (photo detector) 5 that receives light beams L demultiplexed by the optical circuit element 4. The light receiving element 5 is a PD (Photo Diode), for example. The optical module 1 is a light beam receiver, for example, that receives a multiplexed incident light beam L0 from an optical fiber, and is an optical receiver module that demultiplexes the multiplexed incident light beam L0 into light beams L by the optical circuit element 4. The substrate 2 may be installed with a circuit and a light emitting diode (not shown) that transmit optical signals, and the optical module 1 may be an optical transmitter-receiver that transmits and receives optical signals. The plurality of light receiving elements 5 is mounted on a PD carrier 6 installed on the mounting surface 2b of the substrate 2. On the mounting surface 2b of the substrate 2, a TIA (Trans-Impedance Amplifier) 7 is mounted, and the TIA 7 is individually electrically connected to the light receiving elements 5 through a plurality of wires 8. In the following, the direction in which the optical circuit element 4 is provided is sometimes referred to as "up", and the opposite direction is referred to as "below" when viewed from the substrate 2. However, these directions are set for convenience of explanation, and do not limit the directions of the components.

Figure 3:
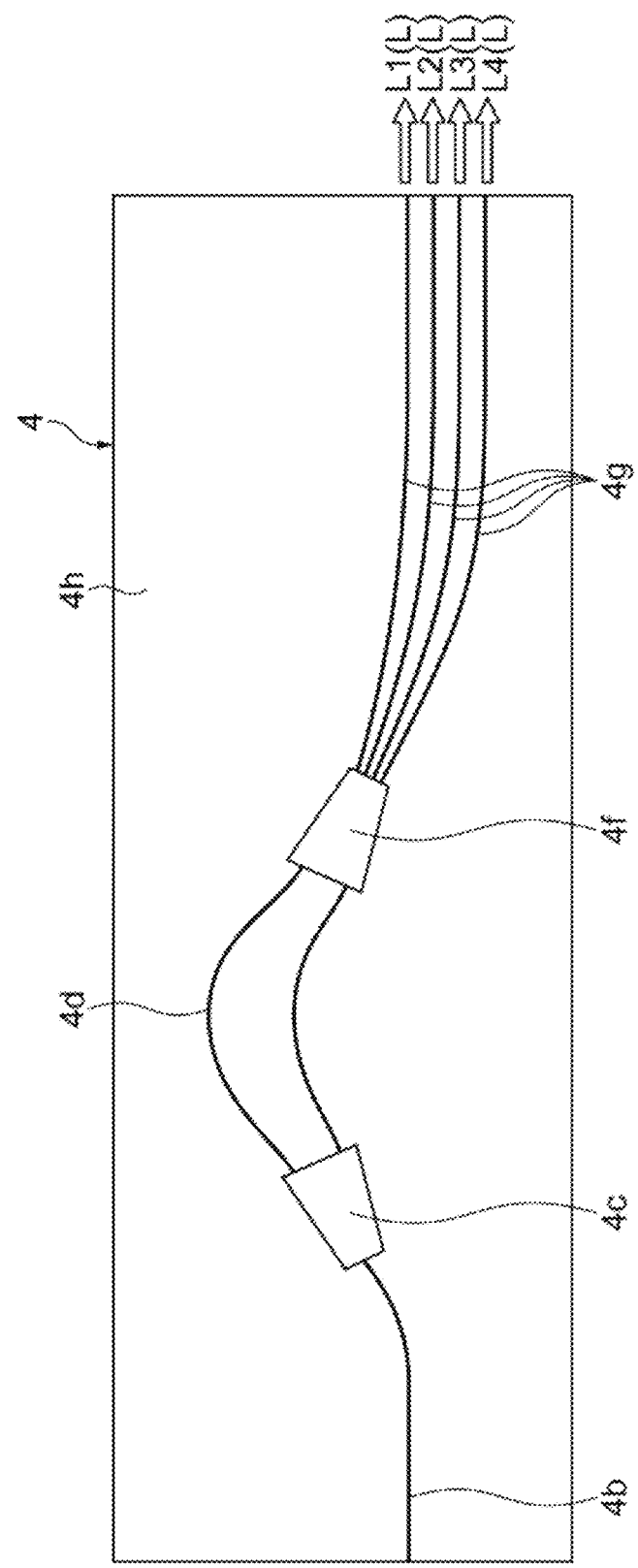
FIG. 3 is a view showing the optical circuit element of the optical module in FIG. 1.

FIG. 3 is a bottom view of the optical circuit element 4 viewed from below. The optical circuit element 4 exemplified in FIG. 3 has an arrayed waveguide grating (AWG). The optical circuit element 4 includes optical waveguides through which light beams from an optical fiber, for example, propagate. The optical circuit element 4 includes, as the optical waveguides, an input waveguide 4b to which a wavelength multiplexed light beam having four wavelengths is entered, an input-side slab waveguide 4c, an arrayed waveguide 4d, an output-side slab waveguide 4f, and four output waveguides 4g. The input waveguide 4b, the input-side slab waveguide 4c, the arrayed waveguide 4d, the output-side slab waveguide 4f, and the output waveguides 4g are formed on an under surface 4h opposite to the mounting surface 2b of the optical circuit element 4. The incident light beam L0 entered from the optical fiber to the input waveguide 4b is entered to the arrayed waveguide 4d through the input-side slab waveguide 4c. The incident light beam L0 is demultiplexed into four light beams L1, L2, L3, and L4 having wavelengths different from each other at the arrayed waveguide 4d. The demultiplexed light beams L1, L2, L3, and L4 are emitted to the outside of the optical circuit element 4 through the output-side slab waveguide 4f and the four output waveguides 4g. Note that in the present embodiment, the light beams L1, L2, L3, and L4 are collectively referred to as the light beam L.

Figure 4:
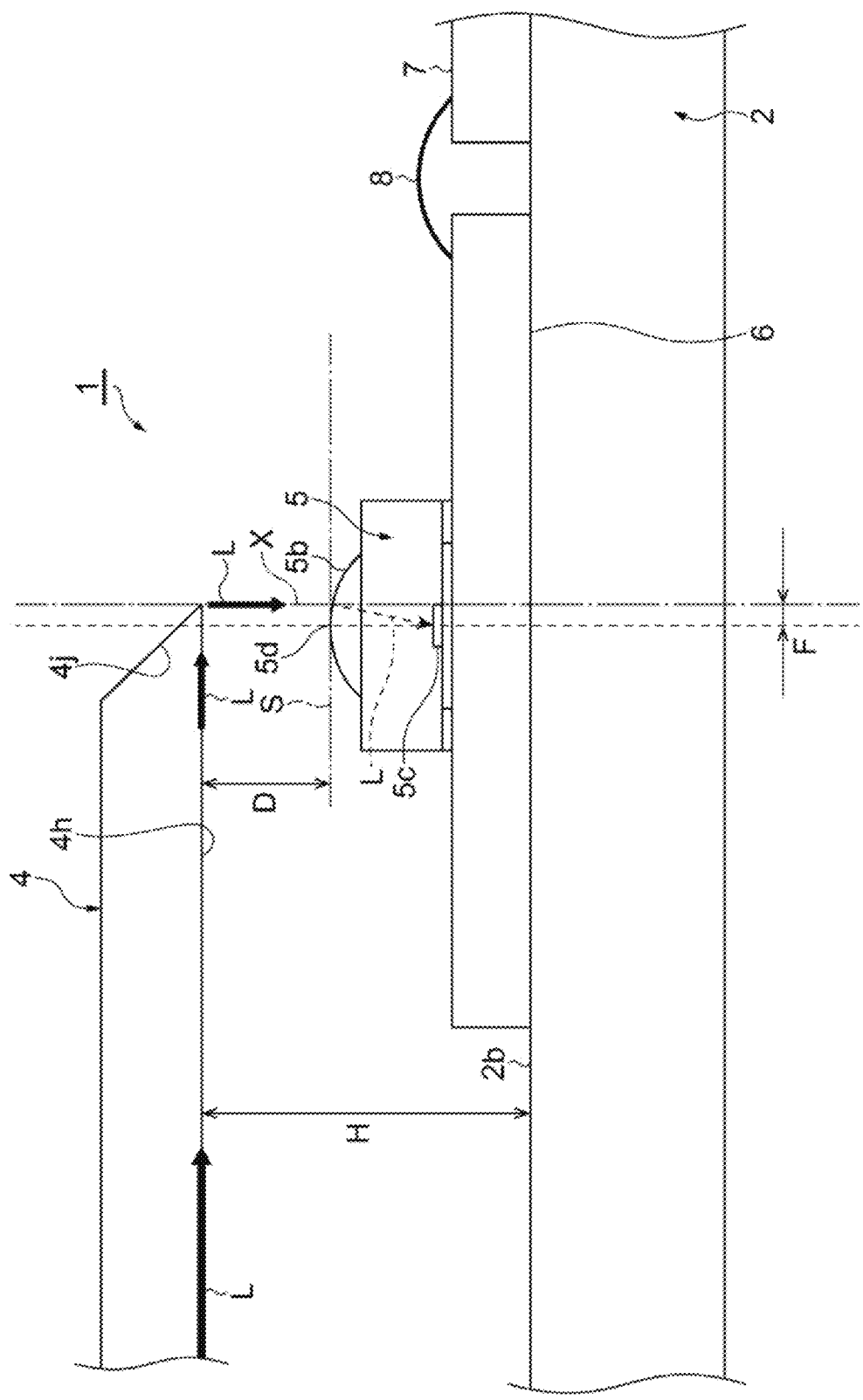
FIG. 4 is an enlarged side view of the substrate, the light receiving element, and the optical circuit element of the optical module in FIG. 1.

FIG. 4 is a side view showing the emitted portion of the light beam L from the optical circuit element 4, the substrate 2, the light receiving element 5, the PD carrier 6, the TIA 7, and the wire 8. As shown in FIG. 4, for example, at the end part of the optical circuit element 4, a reflection plane (reflector) 4j is formed. The reflection plane 4j is a cut surface formed with a taper at an angle of 45° to the vertical direction when the under surface 4h of the optical circuit element 4 is at an angle of 90° to the vertical direction, and the reflection plane 4j bends the traveling direction of the light beam L propagating through the optical waveguides formed on the under surface 4h at an angle of 90°. That is, the reflection plane 4j reflects the light beam L propagating along the under surface 4h of the optical circuit element 4 downwards. The reflection plane 4j emits the light beam L passing through the output waveguides 4g of the optical circuit element 4 downwards as a collimated light beam, and the light beam L emitted from the reflection plane 4j downwards is entered to the light receiving element 5. The support member 3 is in a rectangular cuboid shape, for example (see FIG. 1). The support member 3 has a top surface 3a in surface contact with the under surface 4h of the optical circuit element 4 and an under surface 3b in surface contact with the mounting surface 2b of the substrate 2 (see FIG. 2). The support member 3 is shaped such that the top surface 3a and the under surface 3b are in parallel with each other, and thus the direction of the optical axis of the light beam L to be emitted from the reflection plane 4j can be matched with the normal direction of the substrate 2. That is, the light beam L is perpendicularly emitted to the substrate 2.

The light receiving element 5 is mounted on the mounting surface 2b of the substrate 2 through the PD carrier 6. The light receiving element 5 includes a lens (condenser lens) 5b that condenses the light beam L which is the collimated light beam emitted from the reflection plane 4j of the optical circuit element 4 and a receiving layer (light receiving layer) 5c that receives the light beam L condensed at the lens 5b. For example, the receiving layer 5c has a disk shape. The lens 5b is a convex lens, for example, protruding to the optical circuit element 4 side, and has a curved surface (a spherical surface, as an example) vertically opposed to the reflection plane 4j. The light beam L entered to the lens 5b is condensed at the lens 5b, and the light beam L condensed at the lens 5b is entered to the receiving layer 5c. The light beam L entered to the receiving layer 5c is converted into an electrical signal (a photocurrent), and transmitted to the TIA 7 through the wire 8 described above. The light beam L from the reflection plane 4j is perpendicularly entered to a tangent plane S of a top 5d of the lens 5b. The incident position of the light beam L to the lens 5b is apart from the top 5d by a predetermined offset amount (offset distance) F, and for example, the light beam L is not entered to the top 5d. That is, when viewed from the normal direction of the mounting surface 2b, an optical axis X of the light beam L is apart from the position of the top 5d by the offset amount F.

Figure 8:
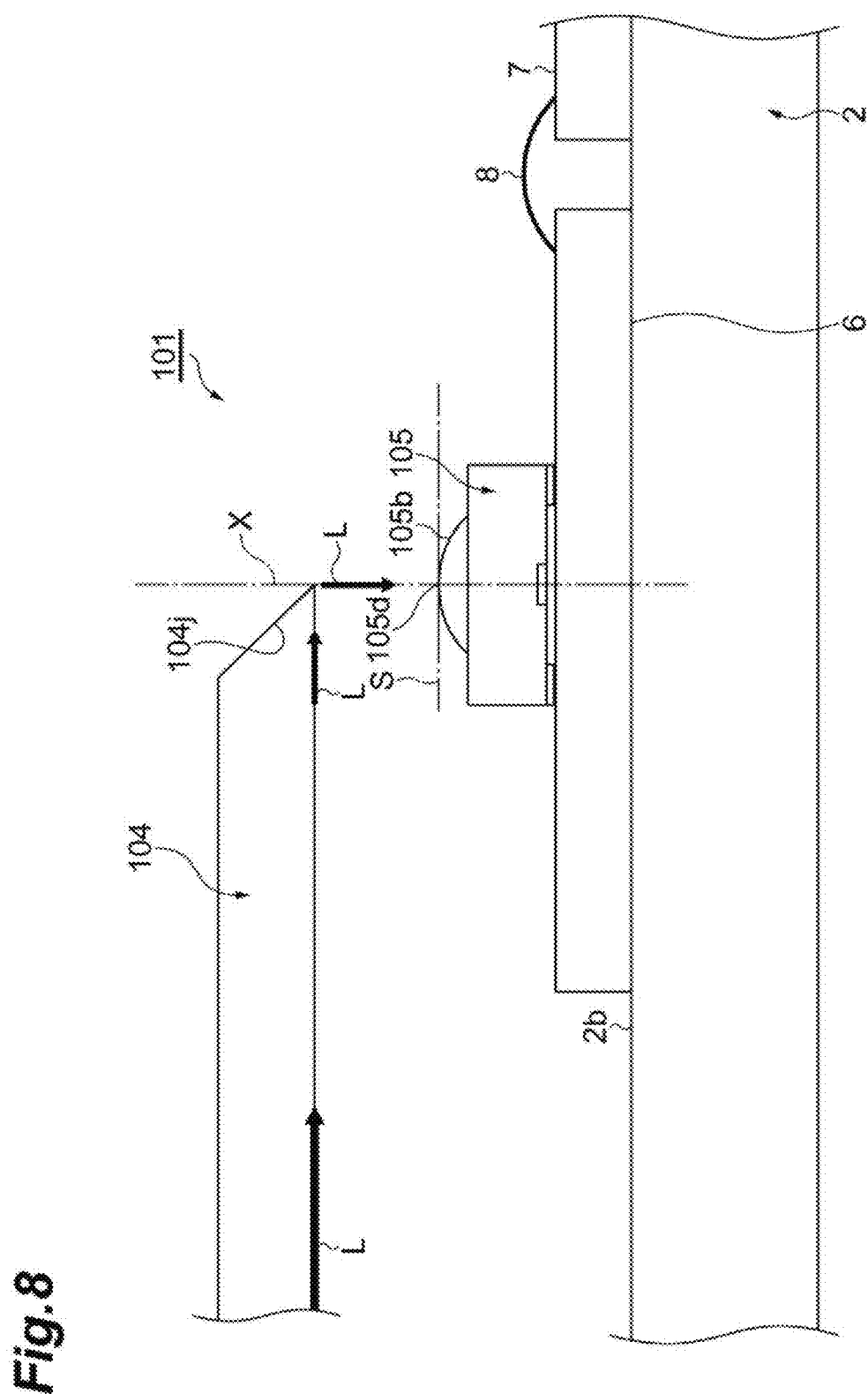
FIG. 8 is a side view showing the light receiving element and the optical circuit element of an optical module of a comparative example.

As shown in FIG. 8, an optical module 101 of a comparative example will be described in which a light beam L from a reflection plane 104j of an optical circuit element 104 is perpendicularly entered to a tangent plane S of a top 105d of a light receiving element 105 and the light beam L to a lens 105b is entered to the top 105d. Note that the optical module 101 is different from the optical module 1 in the incident position of the light beam L to the lens, and the points other than this are the same. In the case of the optical module 101, the lens 105b has a spherical shape, and the light beam L is perpendicularly entered to the top 105d. That is, the tangent plane S has a lens surface perpendicular to the light beam L. Since the light beam L perpendicularly entered to the lens 105b is reflected at an angle of 180° at the lens 105b (the top 105d), the light beam L is possibly a return light beam to the optical circuit element 104. In the optical module 101, since the light beam L is possibly a return light beam to the optical circuit element 104 as described above, a problem of an increase in an ORL (Optical Return Loss) possibly arises.

Figure 9:
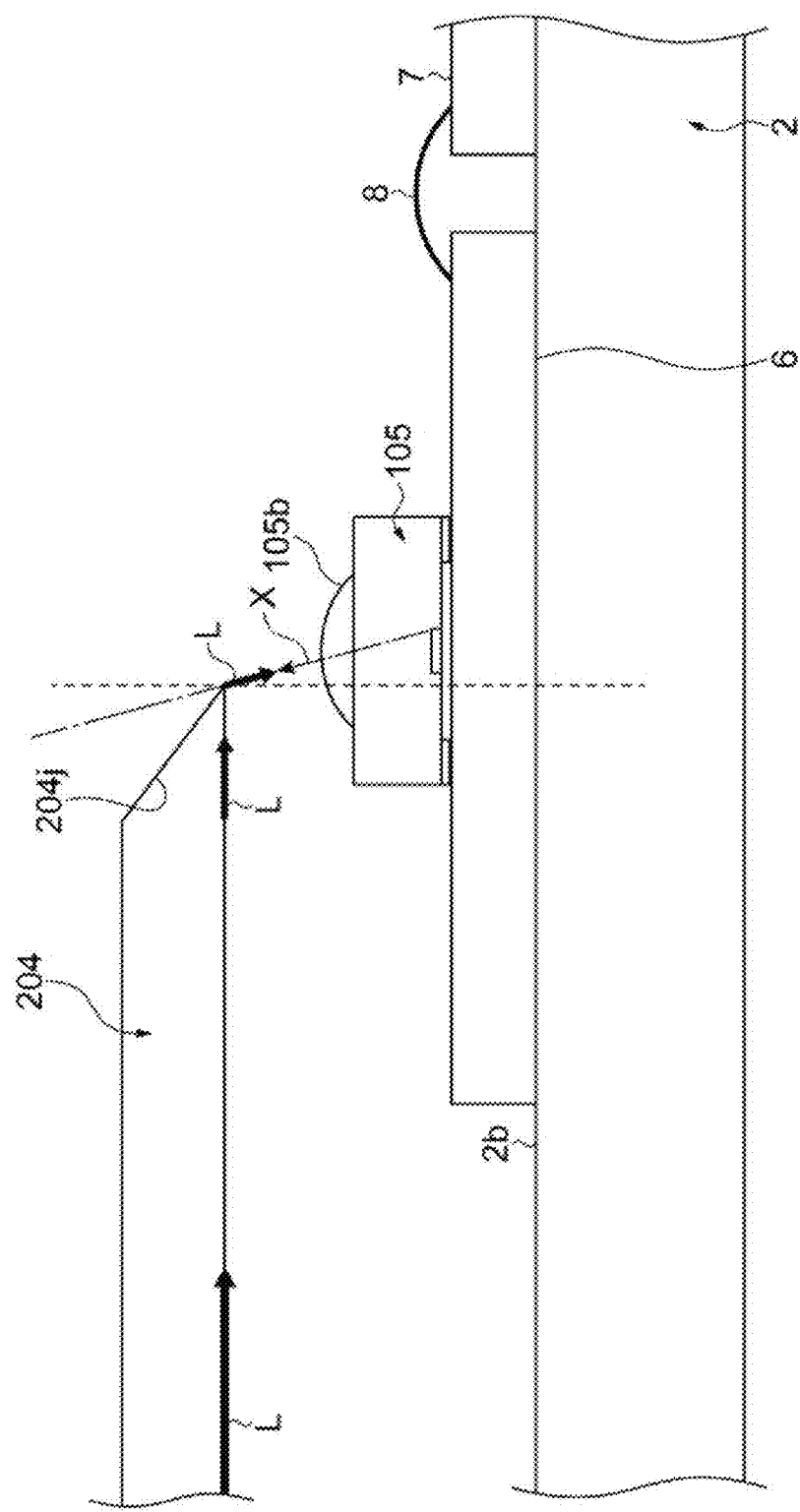
FIG. 9 is a side view showing the light receiving element and the optical circuit element of an optical module of a comparative example different from FIG. 8.

As the measures against the problem, it can be considered that as shown in FIG. 9, for example, instead of the optical circuit element 104, with the use of an optical circuit element 204 having a reflection plane 204j whose tilt angle to the mounting surface 2b is not an angle of 45° (40°, as an example), the emission direction of the light beam L to the lens 105b is changed such that the optical axis X is inclined from the vertical direction. In this case, the light beam L is not perpendicularly entered to the tangent plane of the top 105d of the light receiving element 105. However, even in the case in which the emission direction of the light beam L is changed as described above, the tangent plane whose normal direction is equal to the emission direction of the light beam L is present on the curved surface of the lens 105b, and thus the light beam L having the corresponding component is possibly a return light beam to the optical circuit element 204. Thus, even in the case in which the emission direction of the light beam L is changed using the optical circuit element 204, a problem of an increase in an ORL still possibly arises.

Figure 5:
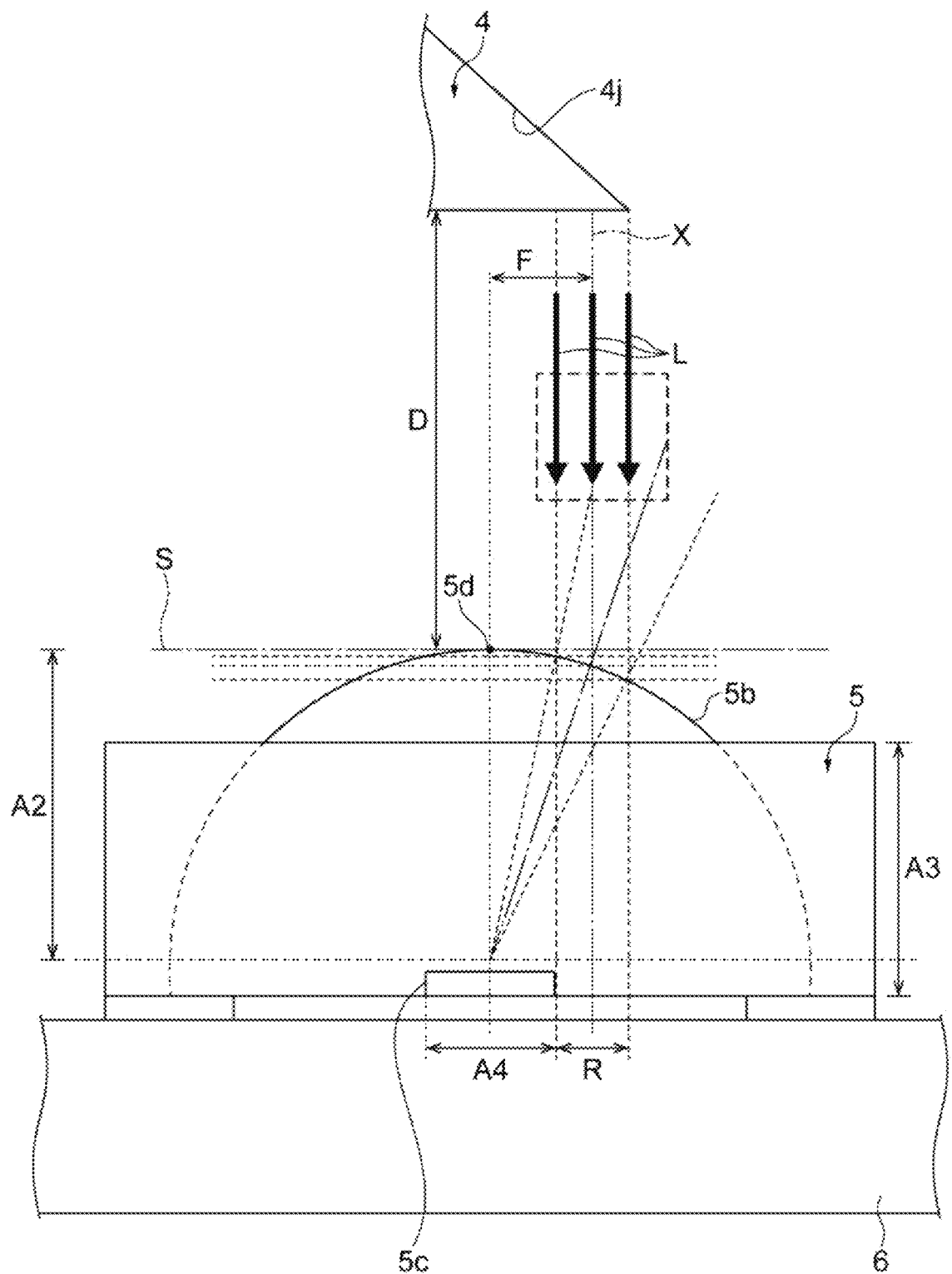
FIG. 5 is an enlarged side view of the lens of the light receiving element in FIG. 4.
Figure 6:
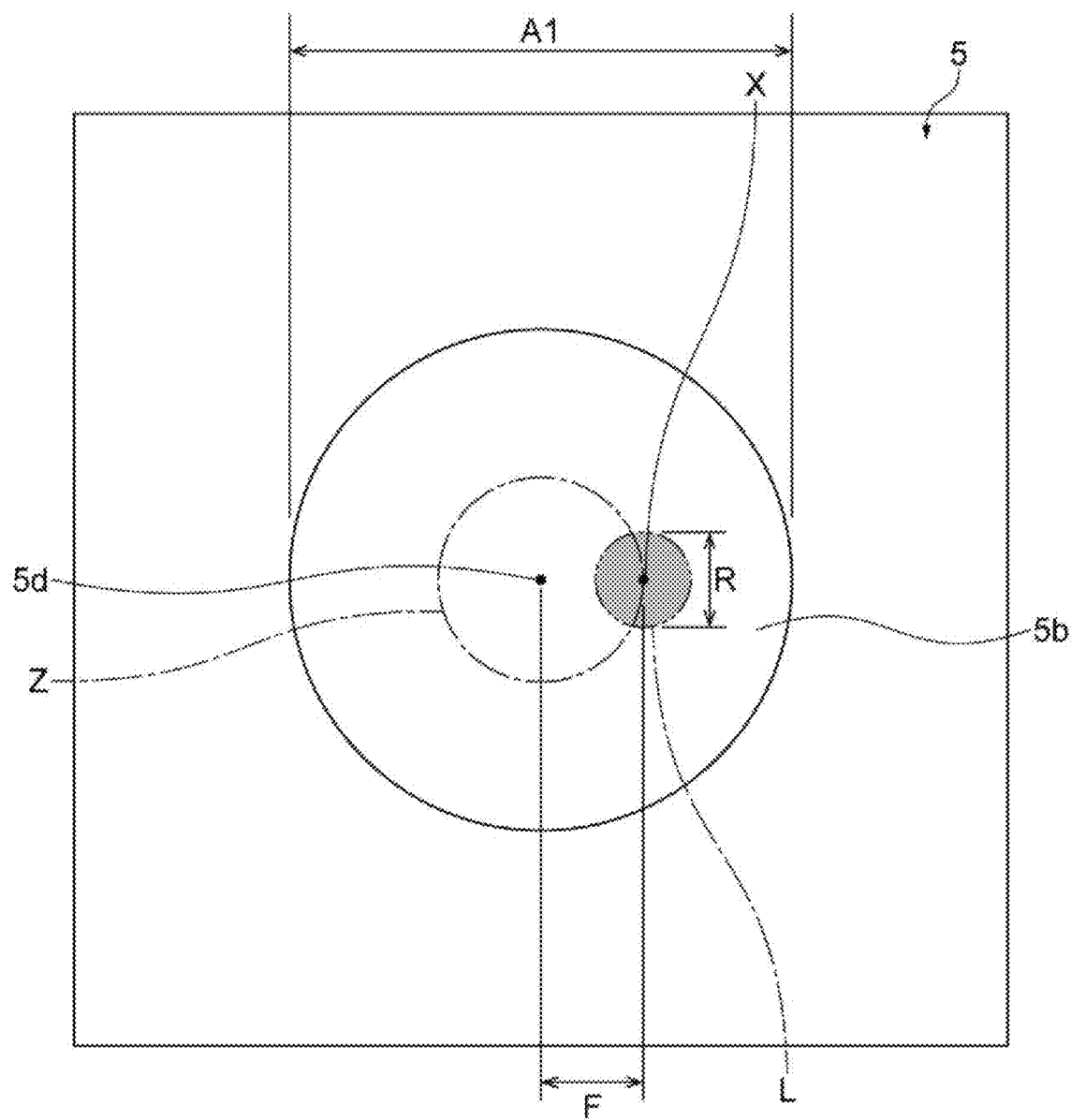
FIG. 6 is a plan view showing the lens of the light receiving element in FIG. 4 and a beam from the optical circuit element.

Therefore, in the present embodiment, the ORL is reduced by a scheme different from FIG. 9. FIG. 5 is a side view showing the light beam L, the lens 5b, and the receiving layer 5c of the light receiving element 5 according to the present embodiment. FIG. 6 is a plan view schematically showing the light beam L and the lens 5b viewed from the normal direction of the mounting surface 2b in the present embodiment. As shown in FIGS. 5 and 6, the light beam L is emitted from the reflection plane 4j to the lens 5b as a collimated light beam having a certain beam diameter R. A vertical distance D from the reflection plane 4j to the top 5d of the lens 5b is set shorter than a predetermined value, and the predetermined value is shorter than a Rayleigh length, for example, described later. As described above, the light beam L that is a collimated light beam is perpendicularly entered to the lens 5b to the tangent plane S of the top 5d, and the light beam L is entered to the portions other than the top 5d of the lens 5b. Thus, since the tangent plane whose normal direction is equal to the emission direction of the light beam L is not present in the range in which the light beam L on the curved surface of the lens 5b is entered, no return light beam to the optical circuit element 4 occurs. The direction in which the optical axis X is offset to the top 5d of the lens 5b can be appropriately changed as long as the optical axis X is located on the concentric circle of the lens 5b, i.e., on a path Z at which the distance from the top 5d is equal.

As an example, an opening diameter A1 of the lens 5b is 100 μm, and a curvature radius A2 of the lens 5b is 70 μm. For example, the beam diameter R of the light beams L is 10 μm, and the offset amount F of the optical axis X from the top 5d of the lens 5b is 10 μm or more. In the case in which the offset amount F is 10 μm, since the incident angle of the light beam L to the lens 5b is 4.0° or more and 12.6° or less, the return of the light beam L to the optical circuit element 4 is suppressed. From the viewpoint of the entrance of the light beam L to the lens 5b, the upper limit of the offset amount F may be 45 μm. A chip thickness A3 of the light receiving element 5 is 150 μm, and a diameter A4 of the receiving layer 5c of the light receiving element 5 is 15 μm. However, these values can be appropriately changed.

Figure 7:
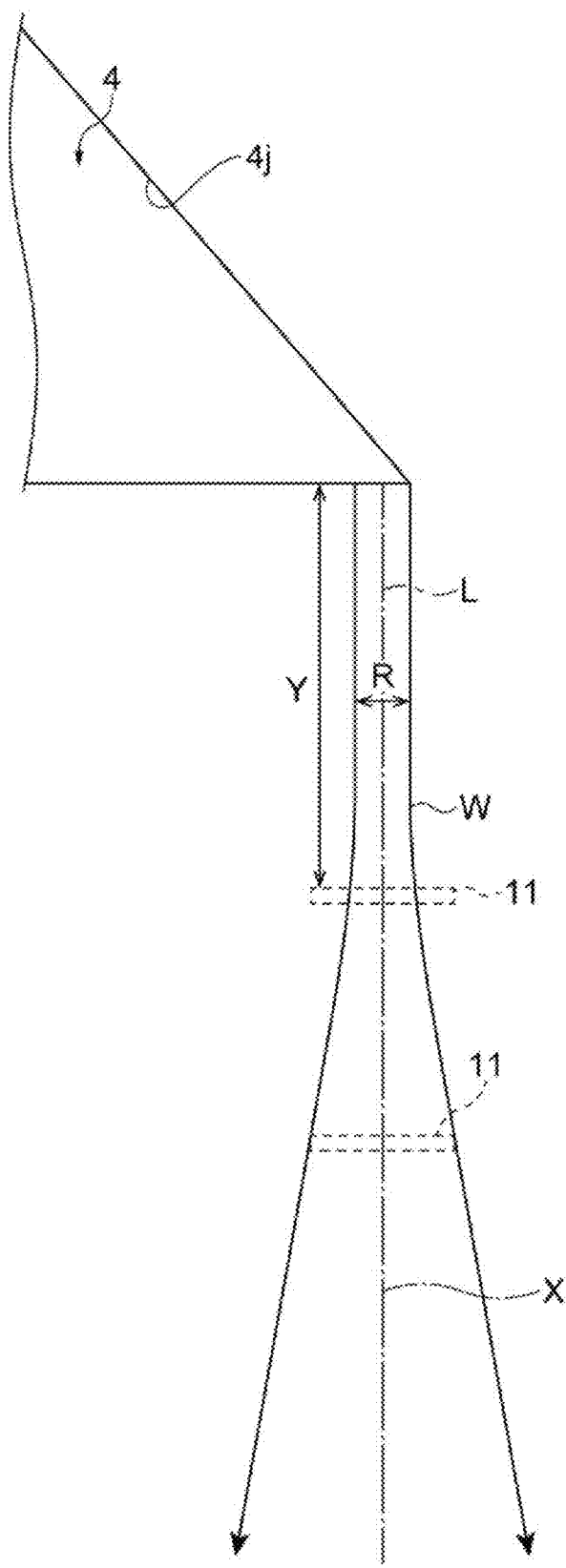
FIG. 7 is a view schematically showing a light beam emitted from the optical circuit element in FIG. 3.

FIG. 7 is a side view schematically showing the light beam L emitted from the reflection plane 4j. As described above, the light beam L that is a collimated light beam is emitted from the reflection plane 4j. The light beam L forms a beam waist W near the emission part of the reflection plane 4j, and travels as a plane wave (a collimated light beam) having the beam diameter R before and after the beam waist W. When the light beam L is apart from the emission part of the reflection plane 4j longer than the Rayleigh length, the light beam L gently diverges. In the present embodiment, the length of the light beam L in the direction along the optical axis X of the light beam L that is a plane wave is a Rayleigh length, and the Rayleigh length is proportional to the square of the radius of the beam waist W. Although the radius of the beam waist W is smaller than the beam diameter, the radius of the beam waist W may be set to R as approximation. The distance from the reflection plane 4j to the lens 5b is set shorter than the Rayleigh length, and thus the light beam L can be entered to the lens 5b in the state in which the light beam L travels at the beam diameter R.

In the present embodiment, an experiment was conducted in which the Rayleigh length was estimated using a surface-incident PD (Photo Diode) whose receiving layer 11 had a light receiving diameter of 50 μm. In this experiment, first, an optical axis X of a light beam L in the receiving layer 11 and an optical circuit element 4 was set to the center of the light receiving diameter of the receiving layer 11, and the light receiving sensitivity of the PD was acquired while the distance of the receiving layer 11 from the optical circuit element 4 was changed. As a result, in the case in which a distance Y from the optical circuit element 4 to the receiving layer 11 was 75 μm or more, the light receiving sensitivity of the PD began to drop. Thus, it is estimated that 75 μm is a value longer than the Rayleigh length. To this, in the case in which the distance Y from the optical circuit element 4 to the receiving layer 11 is 50 μm or less, the light receiving sensitivity of the PD does not drop. Thus, it can be thought that 50 μm is a value shorter than the Rayleigh length.

From the experiment described above, as shown in FIG. 4, the distance D from the reflection plane 4j of the optical circuit element 4, from which the light beam L is emitted, to the top 5d of the lens 5b is preferably shorter than 50 μm that is the Rayleigh length of the present embodiment. That is, the distance from the emission position of the light beam L from the optical circuit element 4 to the lens 5b of the light receiving element 5 is shorter than a distance at which the spread of the light beam L emitted as a collimated light beam is detected, 50 μm or less, for example. For example, the distance D can be appropriately changed by adjusting a height H of the support member 3 that is placed on the mounting surface 2b. The height H of the support member 3 is equal to the distance between the top surface 3a and the under surface 3b.

Next, the operation and effect obtained from the optical module 1 according to the present embodiment will be described in detail. In the optical module 1, the optical circuit element 4 is supported on the base plane 2b of the substrate 2 through the support member 3. The optical circuit element 4 has the input waveguide 4b, the input-side slab waveguide 4c, the arrayed waveguide 4d, the output-side slab waveguide 4f, the output waveguides 4g that are optical waveguides through which the incident light beam L0 propagates, and the reflection plane 4j that reflects the light beam L passing through the output waveguides 4g. From the reflection plane 4j, the light beam L that is a collimated light beam is emitted, and the light beam L emitted from the reflection plane 4j is entered to the lens 5b. The distance D from the reflection plane 4j to the top 5d of the lens 5b is set shorter than a predetermined value. The collimated light beam sometimes spreads in the case in which the collimated light beam propagates far away. When the collimated light beam entered to the lens 5b spreads, the loss of light may occur. To this, in the optical module 1, the distance D from the reflection plane 4j of the optical circuit element 4, from which the light beam L is emitted, to the top 5d of the lens 5b is set shorter than a predetermined value. Therefore, the light beam L from the reflection plane 4j is entered to the lens 5b with no spread. Thus, since the possibility of occurrence of the loss of light can be reduced, light receiving sensitivity can be improved.

In the optical module 1, the light beam L from the reflection plane 4j is perpendicularly entered to the tangent plane S of the top 5d of the lens 5b, and the distance from the position of the top 5d of the lens 5b to the optical axis X of the light beam L is set to a predetermined offset amount F when viewed from the normal direction of the mounting surface 2b (i.e., the vertical direction). Thus, since the light beam L to be entered to the lens 5b is not perpendicularly entered to the curved surface of the lens 5b, a return light beam reflected from the curved surface can be suppressed. Therefore, since the occurrence of a return light beam can be suppressed, light receiving sensitivity can be improved with a reduction in the ORL.

The above-described predetermined value may be determined from the height H of the support member 3. In this case, the distance D from the reflection plane 4j to the top 5d of the lens 5b is determined by the height H of the support member 3 that lies between the substrate 2 and the optical circuit element 4. Thus, the distance D from the reflection plane 4j to the top 5d of the lens 5b can be determined by placing the support member 3 having the adjusted height H on the substrate 2. Therefore, the distance D from the reflection plane 4j to the top 5d of the lens 5b can be easily and accurately set.

The offset amount F may be the beam diameter R of the light beams L or more. In this case, since the offset amount F of the optical axis X of the light beam L from the top 5d of the lens 5b is the beam diameter R or more, the entrance of the light beam L to the top 5d of the lens 5b can be surely avoided. Thus, since the entrance of the light beam L to the top 5d of the lens 5b can be avoided, the ORL can be more effectively reduced.

The above-described predetermined value may be shorter than the Rayleigh length of the light beam L. In this case, since the distance D from the reflection plane 4j to the top 5d of the lens 5b is shorter than the Rayleigh length, the light beam L can be entered to the lens 5b, before the light beam L from the reflection plane 4j spreads. Thus, since the occurrence of a light beam perpendicularly entered to the curved surface of the lens 5b can be more surely suppressed, the ORL can be much effectively reduced.

As described above, the embodiment of the optical module according to the present disclosure is described. However, the present invention is not limited to the foregoing embodiment. That is, a person skilled in the art easily recognizes that the present invention can be variously modified and altered within the scope of the gist described in claims. For example, in the foregoing embodiment, an example is described in which the reflection plane 4j is provided at the end part of the optical circuit element 4. However, the position of the reflection plane can be appropriately modified. In the foregoing embodiment, the optical circuit element 4 that is an AWG is described. However, the type of the optical circuit element can be appropriately modified.

In the foregoing embodiment, an example is described in which four light receiving elements 5 are installed on the mounting surface 2b of the substrate 2 through the PD carrier 6, the TIA 7 is installed, and the optical circuit element 4 is installed through the support member 3. However, the form of the installation of the support member, the optical circuit element, and the light receiving elements installed on the mounting surface 2b of the substrate 2 can be appropriately modified. In the foregoing embodiment, the optical module 1 that is a light beam receiver is described. However, the present invention is also applicable to optical modules other than light beam receivers, including optical transmitters, for example.

What is claimed is:

1. An optical module comprising:
    a substrate having a base plane;
    an optical circuit element having an optical waveguide and a reflector, the optical waveguide being configured to propagate an optical signal in a propagation direction parallel to the base plane, the reflector having a reflection plane inclined from the base plane by 45°, the reflection plane being configured to reflect an optical signal propagated through the optical waveguide and to output a reflected optical signal toward the substrate as a collimated beam;
    a support member supporting the optical circuit element above the base plane;
    a photo detector mounted on the base plane, the photo detector including a condenser lens and a light-receiving layer, the condenser lens being configured to converge the collimated beam onto the light-receiving layer, the light-receiving layer being parallel with the base plane;
    wherein the collimated beam output from the reflector goes toward the condenser lens in a direction perpendicular to a tangent plane at a top of the condenser lens,
    wherein the collimated beam travels along an optical path from the reflector to the tangent plane, the optical path having a shortest distance set to be smaller than a Rayleigh length of the collimated beam, and
    wherein as viewed from a direction perpendicular to the base plane, the collimated beam has an optical axis set apart from the top of the condenser lens by an offset distance.

2. The optical module according to claim 1,
    wherein the support member has a height corresponding to a distance between the base plane and the optical circuit element, and
    wherein the shortest distance is adjusted by varying the height.

3. The optical module according to claim 1,
    wherein the offset distance is set to be larger than a beam diameter of the collimated beam.

4. The optical module according to claim 1,
    wherein the offset distance is set to be smaller than a difference between a radius of the condenser lens and a radius of the collimated beam.

5. The optical module according to claim 1, further comprising a carrier,
    wherein the carrier is mounted on the base plane and the photo detector is mounted on the carrier.

6. The optical module according to claim 1,
    wherein the light-receiving layer has a center point corresponding to a center point of the condenser lens, as viewed from a direction perpendicular to the base plane.

7. The optical module according to claim 1,
    wherein the support member has a rectangular parallelepiped shape.

* * * * *